United States Patent [19]

Reid et al.

[11] Patent Number: 4,606,322

[45] Date of Patent: Aug. 19, 1986

[54] DUAL FUEL CONTROL AND SUPPLY SYSTEM FOR INTERNAL COMBUSTION ENGINES

[75] Inventors: Harvey M. Reid, 11 Wakefield Street; Neil R. Poletti, both of Lower Hutt; Jonathon B. Rainey, Wellington; George L. Jones, Wainuiomata, all of New Zealand

[73] Assignee: Harvey Marshall Reid, New Zealand

[21] Appl. No.: 634,369

[22] Filed: Jul. 25, 1984

[30] Foreign Application Priority Data

Aug. 4, 1983 [NZ] New Zealand .................. 205140

[51] Int. Cl.⁴ ............................................. F02M 39/00
[52] U.S. Cl. ................................... 123/575; 123/458; 123/494; 123/514; 251/129.09
[58] Field of Search ................ 123/575, 576, 577–578, 123/458, 494, 459, 460, 514; 251/137, 140

[56] References Cited

U.S. PATENT DOCUMENTS

| | | | |
|---|---|---|---|
| 1,395,203 | 10/1921 | Olsen | 251/140 |
| 3,190,608 | 6/1965 | Hassa | 251/127 |
| 3,949,713 | 4/1976 | Rivere | 123/458 |
| 4,260,333 | 4/1981 | Schillinoer | 123/458 |
| 4,361,309 | 11/1982 | Sogabe | 251/137 |
| 4,495,930 | 1/1985 | Narajima | 123/575 |

FOREIGN PATENT DOCUMENTS

| | | | |
|---|---|---|---|
| 0102119 | 8/1983 | European Pat. Off. | 123/375 |
| 0108582 | 10/1983 | European Pat. Off. | 123/375 |
| 2112457A | 12/1982 | United Kingdom | 123/375 |

*Primary Examiner*—Carl Stuart Miller
*Attorney, Agent, or Firm*—Poms, Smith, Lande & Rose

[57] ABSTRACT

An electrically controllable dual fuel system for an internal combustion engine (such as, but not necessarily confined to, a diesel engine) having a liquid fuel injection system incorporating an injector pump for delivering prescribed quantities of a principal liquid fuel (e.g. diesel oil) under pressure to individual injectors for the engine cylinders comprising an electronic control unit, an electrically controllable variable flow regulator arranged to receive a combustible alternative fuel (e.g. a gas such as CNG or LPG) under pressure and deliver controlled quantities of the alternative fuel to the engine as determined by signals received by and transmitted from said electronic control unit, by-pass bleed means for bleeding fuel from the principal fuel injection system at the output side of the injector pump and before the injectors and by-passing the bled fuel to a by-pass control system which includes pressure or flow actuated means for measuring the quantity of fuel bled from the injection system and supplying a corresponding signal to the control unit.

18 Claims, 7 Drawing Figures

DUAL FUEL CONTROL AND SUPPLY SYSTEM FOR INTERNAL COMBUSTION ENGINES

This invention relates to internal combustion engines, and more particularly relates to compression ignition or diesel engines designed for operation by high pressure injection of a liquid 'diesel' fuel oil and the adaption of such engines to run on a combination of liquid 'diesel' fuel and an alternative fuel, as for example a gaseous fuel such as a compressed natural gas (CNG), bio gas or producer gas, methane, liquid petroleum gas (LPG) or any other suitable gaseous or alternative liquid fuel combustible in a compression ignition engine. The invention may also have application in whole or in part to engines designed to operate on petrol and like fuels, requiring spark ignition and employing a fuel injection system.

Early attempts at using alternative fuels in diesel engines relied primarily on finding a fuel with similar ignition temperatures to that of conventionally used liquid diesel fuel, or to use blends of alternative liquid fuels and conventional liquid diesel fuel. It was then found that alternative gaseous fuels with low ignition temperatures and high volatility could be mixed with the air entering the engine and ignited at the appropriate moment by the conventional liquid diesel fuel injection. Control of the amount of the two fuels required for operation was relatively easy with constant load stationary engines, and there is a considerable amount of prior art in this field. However, the control of fuel supply is not easy with such as transport vehicles agricultural machines and heavy motorised equipment subject to widely varying load/speed conditions on the engines. Various attempts to control the fuel proportions have mainly been aimed at fractionally reducing the liquid diesel fuel injected, but the control algorithm is not linear because of the severe non-linearity of typical fuel injection pump characteristics and the lack of precise control over the supply of the alternative fuel. Accordingly, in the main moderate replacement of the liquid diesel fuel by the alternative fuel has had to be accepted so that the engine runs reliably and does not produce more than its designed torque output. It has also been found that necessary liquid fuel control often involves altering the characteristics of the injection pump, causing difficulty in fitting the required components.

More recent developments aimed at improving the control of dual fuel supply to diesel engines have been made, and reference may be had in particularly to the specifications of United Kingdom Patent Application No. 8235252 (publication No. 2112457A), and European Patent Applications Nos. 0 108 582 and 0 102 119. However, the dual fuel systems according to the first two of these specifications are more particularly directed to the conversion and operation of diesel engines having circulatory or "common rail" fuel oil injection supply systems, and in particular the "Cummins" diesel engines having pressure/time ("PT") fuel injection systems, and the systems disclosed cannot be efficiently and effectively applied to engines having other liquid diesel fuel injection systems such as the more common 'jerk pump' fuel injection systems. It is important to note that in the common rail or Cummins PT fuel injection systems liquid fuel is delivered from the injection pump to the injector inelts metering orifices at a substantially constant relatively low final delivery pressure (e.g. about 700 kPa) for dispensing prescribed quantities of fuel over a period of time by way of orifices opened and closed by the injection plungers whereas in the jerk pump systems the fuel pressure is raised considerably (e.g. to about 20 MPa) by the injector plungers or pumping elements for substantially instantaneous delivery injection into the combustion chambers of the engine. In the Cummins PT or common rail systems, fuel supplied to the injector pump in excess of the engines requirements is usually continually by-passed back to the supply source from the pump.

The fuel control system according to U.K. Application No. 8235252 is able to employ and control a gas metering valve for alternative fuel supply according to variations in rail pressure in the injector pump determined by draw-off or quantities delivered to the engine, and it is apparent that this system is always dependent on the flow pressure of the liquid fuel to indicate and control the amount of alternative fuel (gas) to be delivered to the engine. The fuel control system according to EP Application No. 0 108 582 employs and controls a gas supply regulator according to pressure variation in the common rail mimicked by a flow restrictor as determined by way of a fuel oil reference supply line *connected as part of the circulatory system downstream* of the throttle control, and sensor means responsive to pressure in such reference supply line. Both systems are designed primarily for common rail or circulatory systems and rely on the maintenance of normal pressure at the injector pump to indicate the actual amount of gas or alternative fuel to be delivered to the engine.

In the case of EP application No. 0 102 119, the disclosed system is indicated as being applicable to engines with fuel injector pump systems of various kinds and not just the Cummins types, but the system does employ a diesel fuel return line from the injector pump and the control of gas as the alternative fuel is necessarily determined by a signal produced as a result of comparison of the liquid fuel flow through the main feed line and the return line. However, the system is also particularly directed to an arrangement in which gas fuel supply is limited according to governor control lever operation (which would involve load sensitivity only) and is further concerned with substitution of relatively low percentages of gas as the alternative fuel.

An object of the present invention is to provide an electronically controllable dual fuel system particularly for (but not necessarily confined to) typical liquid fuelled diesel or compression iginition internal combustion engines and applicable to various kinds of fuel injector systems; such system being effective and efficient in operation and over a wide range of operating conditions and providing for substantially instantaneous variable control of both alternative fuel and liquid diesel fuel supply (the principal liquid fuel) to the engine and preventing the admission of excess alternative fuel and/or the injection of excess liquid diesel fuel when the engine is under any condition.

Another object of the present invention is to provide a control mechanism for a diesel/alternative fuel dual fuelled engine that is accurate, does not allow over or under energising of the engine, is easy to install and maintain and can be easily matched to the characteristics of any diesel engine.

The present invention further provides a dual fuel control system and equipment which is particularly applicable to engines having a liquid fuel injection system for the principal liquid fuel, and whereby the supply of an alternative or supplementary fuel can be directly and accurately controlled in proportion to normal liquid fuel usage so as to match the engine torque curve.

Other and more particular objects, advantages and applications of the present invention will become apparent from the ensuing description.

If the liquid diesel fuel injection is treated as primarily an ignition source, then the alternative fuel, introduced as a gas or vaporised fuel into the engine with the air, provides most of the energy to drive the load. Simplistically, the amount of liquid diesel fuel injected can be a constant, just enough to light the alternative fuel, and independant of the speed or load on the engine. Also simplistically, the amount of alternative fuel introduced needs to equal the difference between the actual fuel used and what would have been used under the same engine conditions using full diesel fuelling. If, as is contemplated by the present invention, a by-pass is provided between the injector pump and the injectors, to bleed off a controlled amount of diesel and return it to the liquid diesel fuel supply tank, then this will provide a means of varying the amount of diesel injected into the engine; and if a controlled pressure regulator dispenses the alternative fuel into the air intake of the engine, then this will provide a means of controlling the amount of this fuel provided to the engine. By further providing a means to measure the amount of liquid diesel fuel bypassed and relate this to the known or calculated requirements of the engine, then this will provide information to control the amounts of the two fuels required by the engine.

According to one aspect of the present invention therefor, there is provided an electronically controllable dual fuel system for an internal combustion engine having a liquid fuel injection system incorporating an injector pump for delivering prescribed quantities of a principal liquid fuel under pressure to individual injectors for the cylinders of the engine; comprising an electronic control unit, an electrically controllable first variable flow regulator arranged to receive a combustible alternative fuel under pressure and deliver controlled quantities of said alternative fuel to the engine as determined by electrical signals received by and transmitted from said electronic control unit, by-pass bleed means for bleeding liquid fuel from the principal liquid fuel injection system at the output side of the injector pump and before the injectors and by-passing the bleed fuel to a by-pass control system, said by-pass control system including means arranged to measure the quantity of fuel bled from the output side of the injection system and supply a corresponding electrical signal to said electronic control unit, said electronic control unit determining the energy value of the proportion of principal liquid fuel normally intended to be supplied to the engine to meet the engines demands at that time but bled from the injection system and controlling the prescribed amount of electric power to said variable flow regulator to enable delivery to the engine of the prescribed quantities of alternative fuel proportional in energy value to that necessary to maintain the required power rating and/or speed of the engine for normal efficient operation.

Other aspects of the present invention include the system according to the preceding paragraph with further components and additional signal generation and supply to the electronic control unit for further control and effective efficient operation of the engine.

The invention further includes the provision of components as a kit set for the fitting of the system to existing engines, and new or existing engines incorporating the system and components, and vehicles having such engines and systems.

Some preferred aspects of the invention will now be described by way of example and with reference to its application to diesel engines in particular and the employment of a gaseous fuel as the alternative fuel, and with reference to the accompanying drawings in which.

Figure 1:
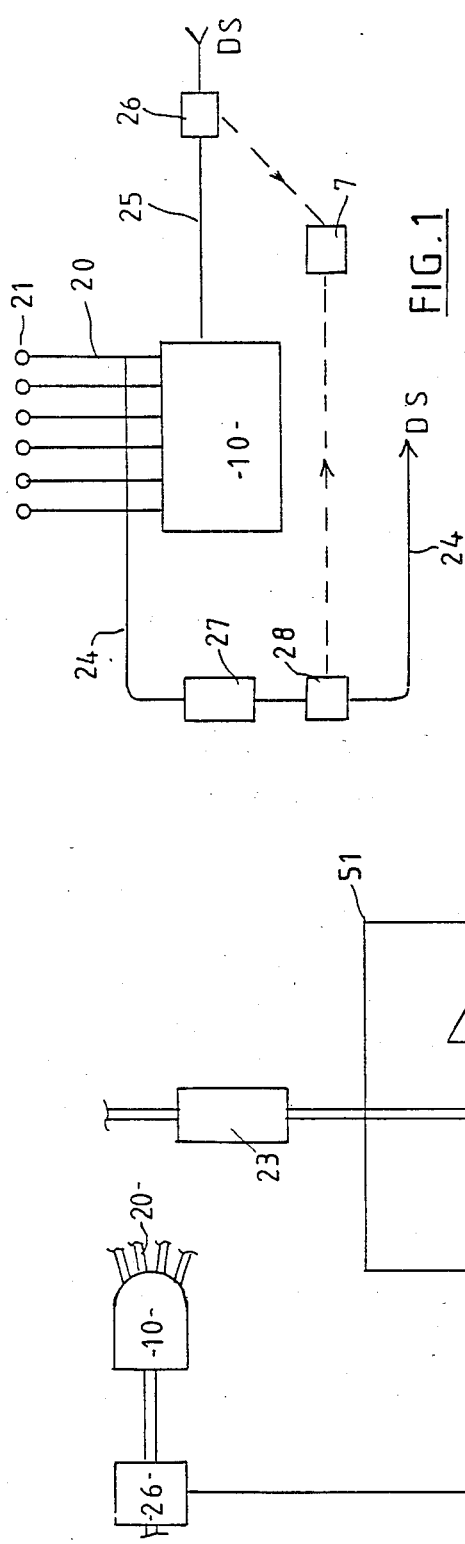
FIG. 1 is a schematic diagram illustrating the basis of one form of the principal system in accordance with the present invention.
Figure 2:
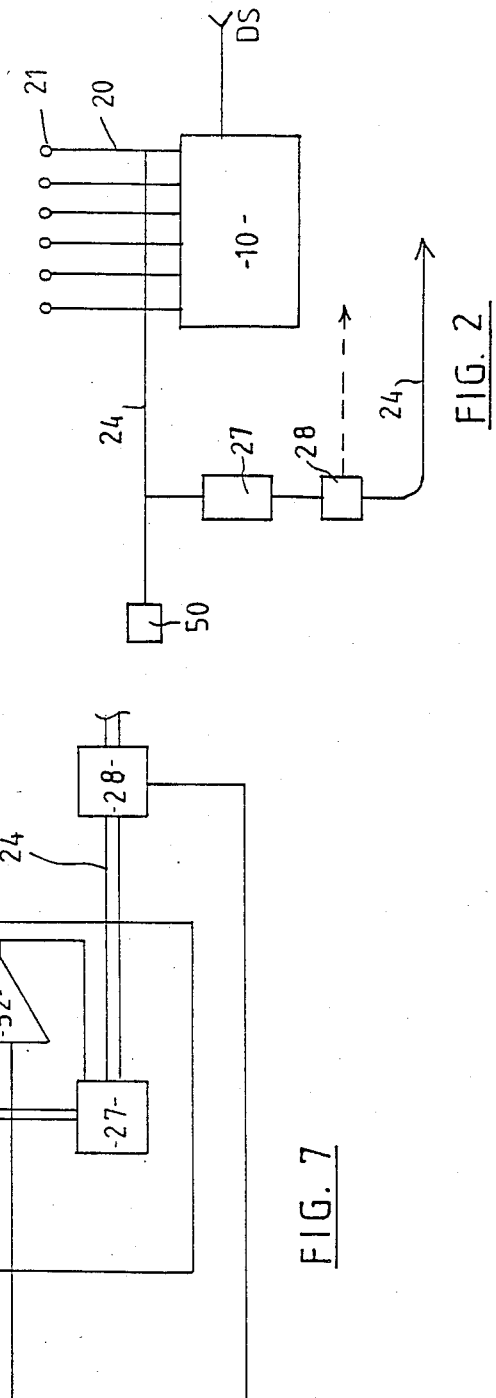
FIG. 2 is a schematic diagram illustrating the basis of an alternative form of the system.

Referring firstly to FIGS. 1 and 2 of the drawings the basis of the principal liquid fuel (diesel fuel) and alternative fuel (gas) control and supply system of this invention is the employment of a liquid fuel by-pass system whereby a by-pass line 24 is provided to be capable of by-passing quantities of liquid diesel fuel from the output side of the normally provided injector pump assembly 10 such as by way of appropriate by-pass fittings (as described later with reference to FIGS. 3 and 4, in particular), connected to the delivery lines 20 between the injector pump 10 and engine cylinder injectors 21, and means for measuring the precise quantity of liquid fuel by-passed against that normally supplied or calculated as being required to be supplied to meet the engine loading and speed under certain conditions and transmitting a signal to an electronic control unit 7 (such as a microprocessor) which can electronically control the precise amount of alternative fuel or gas required to be delivered to the engine at that time to perform the amount of work equivalent to the work that would have been performed by the by-passed liquid fuel under the same conditions. Because of the complexity of the relationship between the by-passed flow and engine speed on the one hand, and the set points of the two fuel controllers on the other, it is necessary to provide a versatile control mechanism like a microprocessor to handle these complexities. This makes it relatively easy to improve the control algorithm by adding other transducers as inputs, or mathematically manipulating the signals for particular engine circumstances. Liquid diesel fuel is supplied to the injector pump 10 from the normally provided tank or supply source DS and the by-passed liquid fuel is returned to the source DS in a closed loop system, and a variable flow regulator 27 controlling the amount of liquid fuel by-passed is provided in the by-pass line 24, the operation of the variable flow regulator 27 being electronically controlled by the control unit 7.

The system according to FIG. 1 can rely upon a flow comparison system utilising a first input flowmeter 26 in the diesel fuel feed line from the supply source DS to the injector pump 10 and a by-pass flowmeter 28 in the by-pass line 24 between the variable flow regulator 27 and return to the supply source DS, both flowmeters 26 and 28 transmitting signals to the control unit 7 for flow comparison with the signal from the by-pass flowmeter 28 determining the liquid fuel fluctuation or quantity by-passed and thus the basis for calculation by the control unit 7 of the equivalent energy gas required to be supplied. Whilst the flowmeter comparison system can be advantageously employed in many instances and has the particular advantage of being capable of adjusting the iquid diesel fuel/gas ratio through all load and speed ranges, there can be some disadvantages in a low pressure liquid fuel supply system with the requirement for pipework than is convenient to use may be necessary and added junctions and components increase possible risk of dirt and/or air entry to the system.

It has been discovered that a varying pressure occurs in the by-pass line 24 and which pressure varies according to the engine load and speed; and by maintaining the pressure in the by-pass line between the injector lines 20 and diesel fuel flow regulator 27 a prescribed proportion of diesel fuel injected can be maintained. Accordingly, and as indicated in FIG. 2 (and to be more particularly described later with reference to FIG. 4) a pressure transducer 50 is provided in the by-pass line 24 to record the pressure in the by-pass line 24 and transmit signal for control of the diesel fuel flow regulator 27 for maintenance of the prescribed pressure in the by-pass line 24. The flowmeter 28 is retained for providing the required flow signal resulting in control of gas flow to the engine. The diesel/gas ratio in this alternative system is mainly variable according to engine speed and not load, and may therefor not always be fully efficient at low loads, but the system is less complicated than the flowmeter system and whilst component costs may be slightly higher installation and maintenance costs may be less than in the flowmeter system and thus this pressure control system may be preferable in many instances. It is believed however that both systems are far more efficient and effective and applicable to a wider range of engines and injector pump systems than the prior arrangements known.

Figure 3:
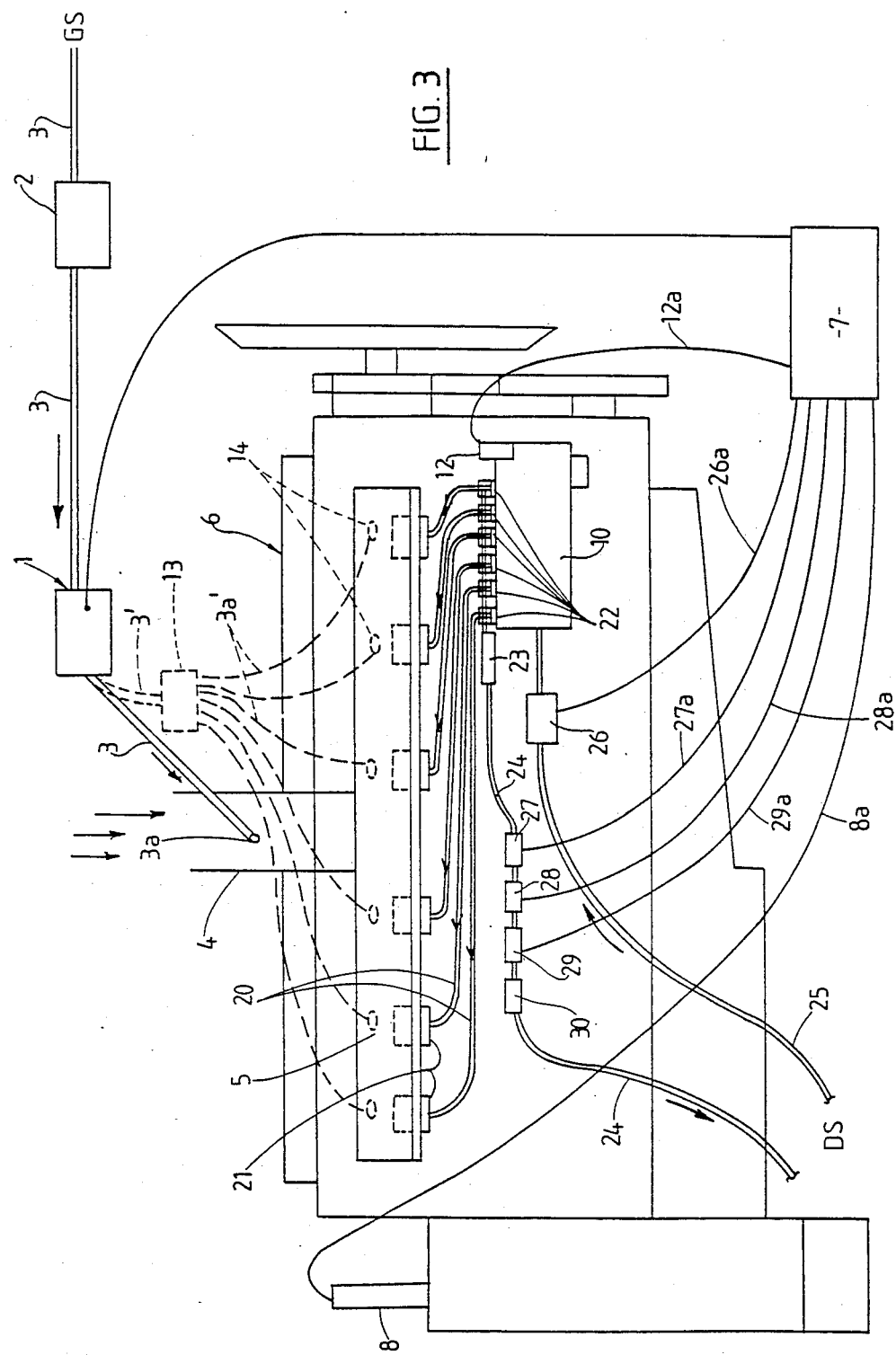
FIG. 3 is a diagrammatic side elevational view illustrating the general arrangement of an engine incorporating the system in accordance with the invention.

Referring now to the more detailed FIG. 3 of the drawings and particularized forms of the invention, gas, such as a compressed natural gas or any of the other gaseous fuels referred to, is arranged to be supplied under pressure from a gas supply source GS to a variable gas regulator 1. In high pressure and liquified gas supply systems, the variable regulator 1 can be preceded by such as a first stage regulator 2 of any known kind to bring the gas to a constant supply pressure; and the variable regulator 1 is arranged to deliver by way of appropriate piping or conduit means 3 a prescribed quantity of the gas to the engine. In a naturally aspirated diesel engine with a non pressurised air induction system, the conduit 3 can deliver gas to the air induction unit 4 associated with the inlet manifold 5 to the engine 6, the gas being admitted (as shown in full in FIG. 3) to the air induction unit 4 by any suitable gas mixer device or outlet 3a whereby the gas can be delivered into the air stream without restricting the air intake and therefore without upsetting the volumetric efficiencies usually applicable to diesel engines. The present invention permits the employment of relatively small diameter bore gas fuel pipes 3 when compared with many known systems requiring large diameter gas feed pipes because of the supply of gas under relatively higher pressure than usual e.g. many known systems employ gas supply for feed pipes in the range or excess of 25 millimeter bore whereas the present invention may utilise small bore pipes of say six to eight millimeters internal diameter bore for a medium size diesel engine.

In the case of engines having a pressurised or boosted air intake system e.g. as in turbo-charged or supercharged engines, difficulties may arise in feeding gas to the air intake as mentioned above. Accordingly (and indicated in broken outline in FIG. 3 of the accompanying drawings) the system can employ an arrangement with the gas fed by way of conduit 3' to a gas distributor 13 and conduits 3a' to individual electronically controlled valves 14 for each cylinder of the engine. The distributor unit 13 thus divides the gas supply equally between the pipes or ducts 3a' to the respective cylinders, and such pipes or ducts 3a' are all preferably of equal bore diameter and equal length to ensure that there is an equal volume of gas at equal pressure available for each cylinder on demand. The feed pipes or ducts 3a' are directed to the respective cylinders by way of the inlet manifold unit 5.

The gas control valves 14 for the respective cylinders are all provided in similar locations and are preferably located for each cylinder at an equal distance from the inlet valve in a four-stroke engine, or at an equal distance from the inlet port in the case of a two-stroke engine, to ensure that the timing of each gas inlet valve 14 can be set so that the injected gas goes into the air stream part way through the intake stroke of the piston of each cylinder so that none of the gas is lost into the exhaust system before the exhaust valve closes or exhaust port is closed in each cylinder. Other timed gas admission means can be employed.

The operational timing of the gas injector or admission valves 14 for the respective cylinders is further regulated by a signal from the control unit 7 based on the information received thereby from such as an engine speed sensing transducer 8 such as a magnetic pick-up transducer, a fuel pressure indicator, a fuel pipe strain gauge or injection pulse signal pick-up means such as a microphone, or other transducer. Each gas injector or admission valve 14 is electrically connected by wires to the control unit 7 to conduct the timing signal for operation of the respective valves 14; and the arrangement can provide that each valve 14 can be opened for a fixed period of time with a variable pressure to give the required variable volume, or opened for a variable period of time to alter the volume of gas injected; or the valves 14 can be arranged for both operations.

Further, the operation of each gas injector or admission valve is preferably timed according to the predetermined position relative to the flywheel marking or equivalent "Top Dead Centre" position of the piston for the respective cylinder, and such predetermined position can be electronically selected and/or adjusted by way of the control unit 7 according to the information and/or signals fed to such unit 7.

The variable regulator 1 operation or actuation is controlled directly by electrical signals from an electronic control unit 7 which in turn is coupled to and arranged to receive signals from components associated with the liquid diesel fuel supply as hereinafter described, and also preferably from the engine speed transducer 8 such as the magnetic pick-up transducer (which may be coupled to or form part of an engine speed or revolutions counter i.e. a tachometer) or other transducer or diesel fuel pulse pick-up means, the magnetic pick-up or other transducer providing an electric voltage pressure first signal which is transmitted by way of connection 8a to the control unit 7 and varies according to the speed of and load on the engine 6.

On receiving the electric signals from both the engine speed transducer 8 (or other transducer) and the components associated with the liquid fuel supply, and flow rate as hereinafter described the control unit 7 senses diesel fuelling change, and selects the correct pressure for gas to flow from the variable regulator 1, such regulator 1 adjusting the supply of pressurised gaseous fuel to the correct prescribed rate for the engines needs.

Diesel fuel is supplied to the engine 6 by a liquid fuel injector pump 10 (which can be any known suitable kind of fuel injector pump—including jerk pumps, common rail pumps, rotary pumps or other delivery units) and the present invention utilises the indicated by-pass system associated with the output side of the injector pump and whereby on change over or partial change over from liquid diesel fuel to gas the quantity of gas supplied to the engine at any stage is maintained directly proportional to the amount of liquid diesel fuel by-passed from the injector pump 10 and having regard to engine speed and power requirements e.g. the system may control the fuel proportions to 20% diesel fuel and 80% gaseous fuel over the complete range of engine speeds or to any other selected percentage and/or engine speed range. The percentage of substitution of gas for diesel can be preselected throughout all engine revolution speeds and throttle openings and/or according to loading factors.

In applying the invention to a typical diesel engine having an independent injector pump system with exposed fuel feed pipes, as illustrated in FIG. 3 of the drawings, the liquid fuel feed pipes 20 extend from the pump 10 to the liquid fuel injectors 21 for the respective cylinders and by-pass connections 22 are provided on the output side of the injector pump 10 to feed a proportion of the liquid fuel directed to the injectors 21 under pressure to a by-pass manifold 23 and fuel line 24 returning to the main diesel fuel supply source or tank DS. The liquid diesel fuel input line or conduit 25 from the supply source DS is provded with an input flowmeter 26, such as a turbine flow meter, which continually measures the amount of fuel received and therefor delivered by the injector pump 10; and an electrical signal providing this information is continually sent to the control unit 7 by way of electrical connection 26a.

The by-pass line 24 is provided in series from the by-pass connections 22 and manifold 23 with an electrically operated variable control regulator 27 actuated by a signal from the control unit 7 through connection 27a, a by-pass flow meter 28 to monitor the flow of by-passed diesel fuel and transmit this information as an electric signal to the control unit 7 by way of electrical connection 28a, a controllable valve such as an electric solenoid lock-off unit 29 actuable on a signal from the control unit 7 by way of connection 29a, and preferably also a simple non-return valve 30 permiting one way flow on to the supply source DS. The by-pass system also preferably incorporates individual non-return or one way valves at the connections 22 or between such connections 22 and the by-pass manifold 23.

Figure 4:
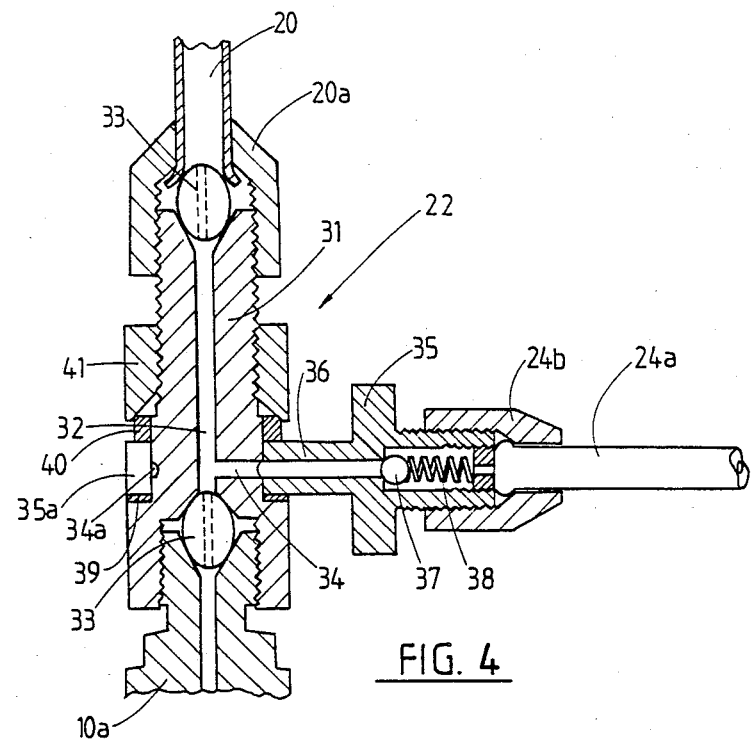
FIG. 4 is a sectional view more particularly illustrating one means for effecting bleeding off of liquid fuel from an injector pump system having exposed injector feed pipe.

One preferred form of by-pass connector 22 and incorporated non-return valve is shown by way of example in FIG. 4 of the drawings. This construction includes a T pipe adaptor having a straight section 31 with one end part internally screw threaded for direct connection to the respective delivery valve holder 10a of the injector pump 10, and the opposite end part externally screw threaded to receive the normal fitting 20a for the feed pipe 20 to the respective injector valve 21. The straight section 31 has an axial bore 32 for the main flow of diesel fuel for injection and appropriate pipe coupling olives 33 may be utilised at the end joints. A by-pass bore 34 and communicating annular groove 34a extends from an intermediate part of the main bore 32 and a transverse swivel connector piece 35, having an annular part 35a located and sealable over the medial part of the straight section 31, is provided with a communicating bore 36 sealable at its outer end by a ball valve 37 and biassing spring 38. The annular part 35a of the connector piece 35 may be clamped and sealed at any convenient angle by appropriate seals 39 and 40 at either side and a locking nut 41. A by-pass pipe 24a, e.g. rigid metal or reinforced and flexible, is connected to the outer end of the connector piece 35 such as by connector nut 24b for communication with the by-pass manifold 23 and line 24.

Thus, in operation of the system, as the variable control regulator 27 is opened some of the liquid diesel fuel normally delivered to the injectors 21 of the engine is allowed to transfer to the by-pass line 24 by way of the respective connectors 22 and pass through the by-pass flow meter 28 and lock-off solenoid valve 29 back to the supply tank or source DS. The quantity or flow of by-passed fuel is measured and compared to the diesel input flow measured by input flow meter 26 and the control unit calculates the equivalent amount of gas required to compensate or replace the by-passed diesel fuel, in conjunction with the associated and relevant other factors aforementioned, and controls the operation and degree of opening of the gas supply variable regulator 1.

Because of the flame speed of some gases used or usable as a substitute for diesel fuel, it may be necessary to advance or otherwise vary the fuel injection timing to give a more complete combustion. This can be done automatically adjusting to a fixed or variable position by utilising a separate take-off from the control unit 7, and the arrangement may provide that where injector pump 10 has an externally accessible automatic advance unit 12, such as is commonly provided in a rotary pump, or an electronically controlled advance coupling for in-line pumps, such advance unit 13 can be modified and the signal via the separate takeoff 12a from the control unit 7 can operate an actuator on the modified advance unit 12 to select the desired injection timing or advance according to the engine revolutions or speed, or according to the load on the engine. The auto advance system for the diesel fuel injection pump 10 can be arranged for actuation when the engine is on dual fuel operation on a signal from the control unit 7.

The system can include a remote control change-over switch for the dual fuel operation, and such switch may actuate an electro-magnetic solenoid shut-off valve positioned in the gas line at or near the filler and before the other components of the system. Preferably the electrical system is made fall-safe so that the gas supply is automatically switched or cut off upon loss of electric power to or failure of any part of the circuit—this can be achieved with control of the electro-magnetic solenoid lock-off or shut-off valve for gas supply so that the engine reverts to full liquid diesel operation; and/or by providing a fall-safe electro-magnetic solenoid operated variable flow regulator 1 with a positive valve closure on electric power loss or controlled switch-off is provided for gas supply.

One preferred arrangement of electromagnetically actuated valve such adapted as the variable flow regulator provides that the electromagnetic force is used to close the valve against the supply pressure rather than open it, to have the effect of setting up a force balance between the electromagnetic force and force developed at the valve seat due to the differential pressure across it due to the flow of the controlled media. Thus, the pressure drop across the valve or variable flow regulator can be made proportional to the electrical current flowing in the electromagnet coil.

In the case of the gas valve or variable flow regulator 1 if such a device is supplied with gas at a constant pressure from the fixed pressure or first stage regulator 2 supply from the gas source GS, and if the outlet of the flow regulator 1 is restricted with a fixed orifice before discharging into the atmospheric air being drawn into the engine 6 the flow of gas into the engine 6 may be controlled smoothly over a wide range by varying the current in the coil. The volume flow rate of gas will be proportioned to the square root of the pressure across the orifice and hence the square root of the current. The performance of such a system may be improved by measuring the pressure of gas upstream of the orifice using an electrical pressure transducer and closing a feedback loop with the control valve to control this pressure to good accuracy.

Figure 5:
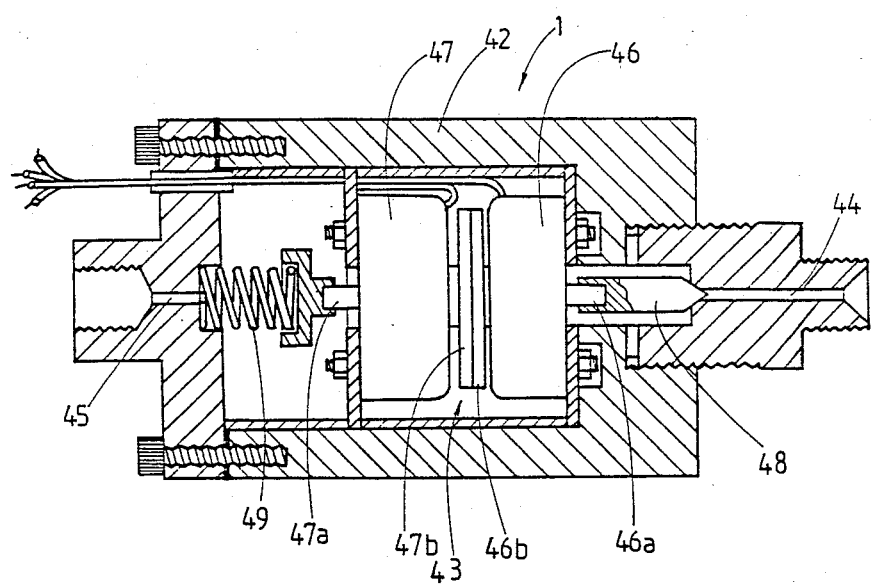
FIG. 5 is a longitudinal sectional view illustrating one preferred form of variable flow regulator usable in the system according to this invention.

One such preferred regulator or fluid flow control unit is particularly described with reference to FIG. 5 of the accompanying drawings, and includes a housing 42 defining a main chamber 43 and having co-axial inlet and outlet connections 44 and 45 communicating with the main chamber 43 for the passage of gas therethrough. A pair of solenoid units 46 and 47 are mounted in co-axially aligned back to back spaced relationship within the main chamber 43 and the shaft 46a of the solenoid unit 46 nearest the inlet connection 44 is coupled to a needle or tapered valve member 48 associated with a valve seat of the inlet 44 so as to be movable by solenoid unit 46 between the fully closed position illustrated and a fully open position or selected intermediate positions controlling the flow and pressure of gas released to the engine 6; the valve member 48 shape providing for variable opening relative to the valve seat for accurate variable fuel flow control. A ball valve can replace valve member 48.

The second solenoid unit 47 has its shaft 47a normally biassed by a compression spring 49 inwardly towards the first solenoid 46 and shaft 46a to have an inner end part 47b abutting but not connected to an inner end part 46b of the first solenoid shaft 46a, so that with no electric power supplied to the second solenoid unit 47 the spring 49 biases and maintains the control valve member 48 in the fully closed position. On switching the system on and supplying electricity to the second solenoid unit 47, the shaft 47a and inner end part 47b are moved outwardly against the bias of spring 49 to allow operation of the first solenoid unit 46 in controlling the extent of valve opening according to the strength of the electric signal provided and determined by the control unit 7. The arrangement provides for gas flow over the shafts 46a and 47 and through the solenoid cores to provide a beneficial cooling effect.

It is further envisaged that a similar variable flow regulator, can also be utilised as the by-pass regulator 27, controlling the bleed or by-pass flow of principal liquid fuel.

It is to be appreciated that the variable flow regulator described above with reference to FIG. 5 of the drawings is not necessarily confined to the particular form illustrated, and that variations in the components and operation can take place whilst retaining the general principles involved. For example, it is envisaged that a single solenoid unit may be employed instead of the two units 46 and 47; and the arrangement may provide for the valve member 48 to be normally free and open without electric power to the unit, but urged towards the valve seat against the incoming fuel pressure on supply of electric power to the unit with the valve member 48 being movable by the solenoid between fully open and fully closed positions, or vice versa, and/or to selected intermediate positions.

In the case of the liquid diesel by-pass control regulator 27 a similar unit can control the pressure of liquid fuel in the one-way by-pass manifold 23 and hence the amount of fuel by-passed. Further, a pressure transducer 50 upstream of the regulator 27 and incorporated into a servo feedback system can improve the accuracy to which the pressure may be controlled. Alternatively, if a further flow meter (as proposed at 26) is installed in the liquid fuel input supply line 25 to the injector pump 10 a servo may be set up to control the regulator 27 in such a manner that a required percentage of liquid fuel is injected into the engine 6 by controlling the presssure in the manifold 23 such that the signal (flowrate) from the by-pass flowmeter 28 is the required percentage of the input flowmeter 26.

Figure 7:
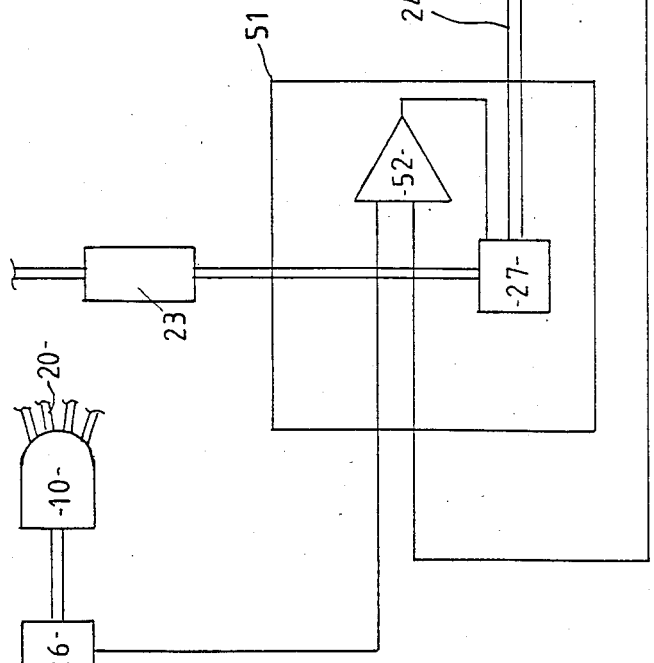
FIG. 7 is a schematic diagram illustrating part of the system according to FIG. 1.
Figure 6:
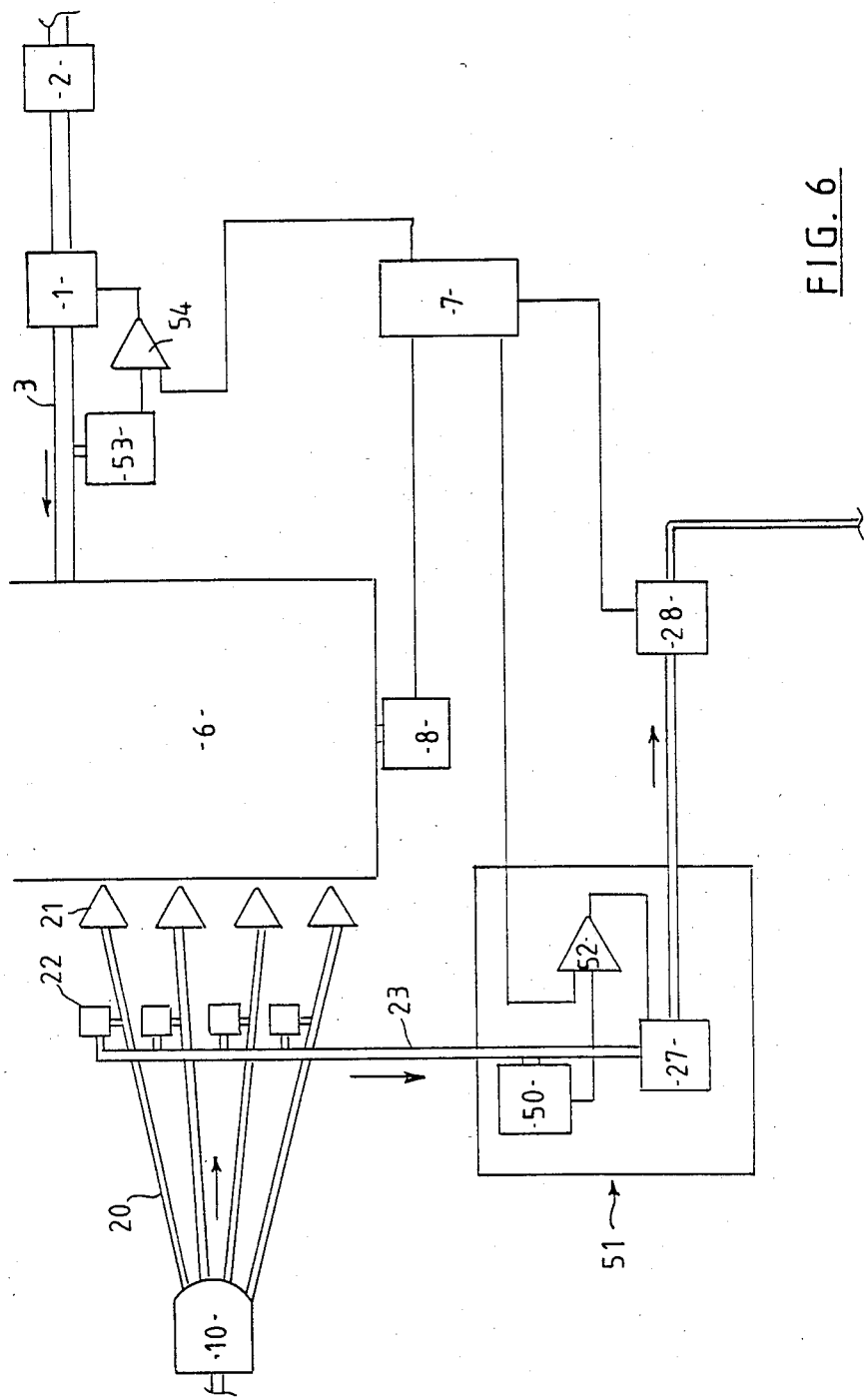
FIG. 6 is a schematic diagram more particularly elaborating upon the basis of the system according to FIG. 2.

Referring now to the schematic drawings of FIGS. 6 and 7 and with reference firstly to FIG. 6 showing a preferred aspect of the control equipment; as previously indicated for the liquid diesel fuel control, a connection is made to each of the fuel lines 20 between the injector pump 10 and the injectors 21 through non-return valves, and combined in a manifold 23. This manifold 23 is maintained at a particular pressure by a pressure control servo system 51, and two possible servo system techniques are proposed. In one preferred technique the previously referred to pressure transducer 50 supplies a signal which is fed to the variable flow regulator 27 (preferably an electromagnetic control valve) through a servo amplifier 52. FIG. 7 shows the alternative technique, where the signal fed to the servo amplifier 52 is the difference in liquid fuel flow rates between the previously proposed input flow meter 26 in the main line 25 to the injector pump 10, and the by-pass flow meter 28 in the by-pass line 24 back to the tank or supply source DS.

Returning to FIG. 6, the set point of the pressure servo system 51 is supplied by the microprocessor control unit 7 and is a function of the speed of the engine as supplied by a tachometer or other engine speed transducer 8. The amount of by-passed fuel is measured by the by-pass liquid fuel flowmeter 28, and the information supplied by way of a signal to the microprocessor control unit 7. In the alternative technique for diesel fuel control, as previously described with reference to FIG. 7 above, this flowmeter 28 has the two functions of supplying information to both the servo amplifier 52 and the microprocessor control unit 7. In the control and supply of gas as the alternative fuel, a gas pressure transducer 53 supplies a signal to a gas servo amplifier 54 which drives an electromagnetically controlled pressure regulator 1'. The set point of this regulator 1' is contr4lled by a signal from the microprocessor control unit 7 and is a function of the flow of by-passed diesel fuel back to the supply source DS. As previously indicated where the alternative fuel is stored at a high pressure, a first stage regulator 2 can be provided to reduce the pressure to a manageable value before it is handled by the servo regulator 1'.

Because the processor control unit 7 can handle the control using any relationship between the parameters, it is easy to change the philosophy of control. For example, if instead of maximising the replacement of liquid diesel fuel by the alternative fuel, it was required to add only a small amount of alternative fuel to reduce the pollution emissions from the engine to a minimum, then this would have profound effect on the atmospheric pollution in major cities.

If the microprocessor is fed a signal from the gas servo amplifier 53 that carries the information on whether ther servo amplifier 53 is in regulation or not, then an automatic changeover from dual fuel to full liquid diesel fuel operation can be accomplished when the alternative fuel supply is exhausted; and if a signal is taken to the microprocessor control unit 7 from the engine key-switch, the processor can control engine shut down for both fuels. The microprocessor control unit 7 can also control solenoid non-return valves in both the by-pass line 24 and the gas line 3, and operate these two solenoid valves by pulsing a watch-dog timer so that control reverts to full liquid diesel fuel operation in the event of failure of the microprocessor control unit.

It will be seen that the present invention is not limited to any particular size or kind of diesel engine and may be applicable to many kinds from one horsepower to 10,000 horsepower, direct or indirect injection. It can be utilised in fixed speed engines such as electric generator engines and various industrial and automotive applications with only slight modifications or variations to the components and their settings.

Further, some preferred aspects of the invention have been described and illustrated with reference to a gas or gaseous fuel being the alternative fuel, but it will be appreciated and evident from the aforegoing description that an alternative fuel in the form of a vaporisable combustible liquid fuel, e.g. such as a methanol or other natural or synthetic liquid fuel, can be similarly delivered to an engine by the dual fuel control system of this invention with little or no modification to the principal components apart from supply modifications as may be necessary to suit the liquid fuels. The diesel fuel (principal fuel) supply and control would be unchanged.

While some preferred aspects of the invention have been described by way of example and with reference to the accompanying drawings, it will be appreciated that other variations of and modifications to the invention can take place without departing from the scope of the appended claims.

We claim:

1. An electronically controllable dual fuel system for an internal combustion engine having a liquid fuel injection system incorporating an injector pump for delivering prescribed quantities of a principal liquid fuel under pressure to individual injectors for the cylinders of the engine, comprising:

an electronic control unit, an electrically controllable first variable flow regulator arranged to receive a combustible alternative fuel under pressure and deliver controlled quantities of said alternative fuel to the engine as determined by electrical signals received by and transmitted form said electronic controlled unit, a by-pass control system, including:

by-pass bleed means for bleeding liquid fuel from the principal liquid fuel injection system at the output side of the injector pump and before the injectors and by-passing the bleed fuel through the by-pass control system, a second electrically controllable variable control regulator to control the quantity of principal liquid fuel capable of being bled and by-passed from the output side of the injector pump, and a by-pass flow meter arranged to measure the quantity of principal liquid fuel bled from the output side of the injection system and supply a corresponding electrical signal to said electronic control unit, said electronic control unit determining the energy value of the proportion of principal liquid fuel normally intended to be supplied to the engine to meet the engine's demands at that time but bled from the injection system and controlling the prescribed amount of electric power to said variable flow regulator to enable delivery to the engine of the prescribed quantities of alternative fuel proportional in energy value to that necessary to maintin the required power rating and/or speed of the engine for normal efficient operation.

2. A dual fuel system as claimed in claim 1 wherein the by-pass control system includes a manifold to which the principal liquid fuel bled from individual injector delivery lines at the output side of the injector pump is directed, and said second variable flow regulator is located downstream of said manifold.

3. A dual fuel system as claimed in claim 1 wherein said by-pass bleed means is provided with non return valve means restricting said bled principal liquid fuel against return to the injector pump and/or injectors.

4. A dual fuel system as claimed in claim 1 wherein an input flowmeter is provided between a source of supply of the principal liquid fuel and the input side of the injector pump, and said input flowmeter is arranged to measure the input quantity of principal liquid fuel and transmit a corresponding electric signal to said control unit for comparison with the signal from the by-pass flowmeter to the control unit for determining the relative proportions of principal fuel fed to and bled from the injector delivery system, and calculation and control of the required quantity of alternative fuel to be supplied to the engine.

5. A dual fuel system as claimed in claim 1 wherein the by-pass control system incorporates a pressure transducer arranged to sense the pressure of principal liquid fuel bled into the by-pass control system and to transmit a corresponding electric signal to said control unit to enable said control unit to control alternative fuel supply according to said pressure.

6. A dual fuel system as claimed in claim 1 wherein the control and supply of principal liquid fuel and alternative fuel is engine speed related and determined by means of an engine speed transducer arranged to transmit an engine speed electric signal to said control unit.

7. A dual fuel system as claimed in claim 1 wherein the alternative fuel is arranged to be delivered to an air intake or induction system of the engine.

8. A dual fuel system as claimed in claim 1 wherein the alternative fuel is arranged to be delivered directly to individual cylinders of the engine by means of an individual electronically controlled valve for each cylinder of the engine.

9. A dual fuel system as claimed in claim 8 wherein the alternative fuel inlet or delivery points for the cylinders of the engine are all at equal distances from the respective cylinder inlets for the intake air and delivery of the alternative fuel to the cylinders is timed to take place part way through the intake stroke of the piston of each cylinder.

10. A dual fuel system as claimed in claim 9 wherein the operational timing of the individual electronically controlled valves is further regulated by a signal from the control unit based on information received thereby from engine speed and/or load and/or principal liquid fuel pressure/pulse transducer means.

11. A dual fuel system as claimed in claim 1 wherein the alternative fuel supply line and the principal liquid fuel by-pass control system are each provided with an electric solenoid lock-off unit actuable on a signal from the control unit to prevent or allow fuel flow through the respective line, and whereby the alternative fuel supply is immediately cut-off on exhaustion of such supply and/or on failure of the electrical system of or for the control unit and the fuel control system reverts to single principal liquid fuel operation of the engine.

12. A dual fuel system as claimed in claim 1 wherein said first electrically controllable variable flow regulator comprises an electro-magnetic solenoid valve unit including a housing defining a main chamber having
  inlet and outlet connections communicating with the main chamber for the passage of alternative fuel therethrough, at least one electric solenoid unit mounted within said chamber with a shaft of the solenoid unit near the inlet connection being coupled to a valve member associated with a valve seat of the inlet connection so that the valve member is movable by said solenoid unit between fully closed and open positions, or vice versa, and/or to any selected intermediate position in controlling the flow of alternative fuel through said regulator, said valve member being normally movable towards or away from said valve seat and being shaped and arranged for variable opening relative to the valve seat and variable fuel flow control.

13. A dual fuel system as claimed in claim 12 wherein said chamber of said electro-magnetic solenoid valve unit houses two solenoid units co-axially aligned in back to back relationship and the first solenoid unit nearest the inlet connection is the unit having its shaft connected to said valve member, the other of said solenoid units having a shaft normally biassed by a compression spring towards said first solenoid unit and its shaft to provide an arrangement whereby said spring biases and maintains said valve member in a fully closed position in the absence of electric power supply to the solenoid units, and on supply of electric power to the solenoid units the shaft of said other solenoid unit is moved against the closing bias of said compression spring to enable operation of the first solenoid unit for variable control of the valve member opening and closing for fuel flow through the regulator.

14. A dual fuel system as claimed in claim 1, wherein the by-pass control system includes a manifold to which the principal fuel bled from individual injector delivery lines at the output side of the pump is directed, a second electrically controllable variable flow regulator for control of the principal fuel capable of being bled and by-passed and located downstream of said manifold, a pressure transducer for sensing the by-passed fuel pressure in said manifold and transmitting a corresponding electric signal to said control unit, and a pressure control servo system including a servo amplifier, the electric signal from said pressure transducer being arranged to control said servo amplifier for controlling operation of said second variable flow regulator to maintain a prescribed pressure in said manifold.

15. A duel fuel system as claimed in claim 1, wherein the by-pass control system includes a manifold to which principal fuel bled from individual injector delivery lines at the output side of the injector pump is directed, a second electrically controlled variable flow regulator for control of the principal fuel capable of being bled and by-passed and located downstream of said manifold, the by-pass flowmeter for measuring the quantity of principal liquid fuel bled and by-passed being located downstream of said second variable flow regulator, and a pressure control system including a servo amplifier for controlling said second variable control regulator; there being further an input flowmeter located between a source of supply of the principal liquid fuel and the input side of the injector pump to measure the input quantity of principal liquid fuel and transmit a corresponding electric signal to the control unit for comparison with the signal from the by-pass flowmeter for determining the relative proportions of principal fuel fed to and bled from the injector delivery system, said electric signals from the input and by-pass flowmeters indicating the differences in flow rates of the principal liquid fuel being arranged to control the servo amplifier which in turn controls operation of said second variable flow regulator to maintain a prescribed pressure in said manifold.

16. A dual fuel system as claimed in claim 1, wherein the operation of the first variable flow regulator for the alternative fuel is controlled by way of a servo amplifier which in turn is controlled according to an electric signal from an alternative fuel pressure transducer in association with signals from the by-pass control system.

17. A duel fuel system as claimed in claim 1 wherein said second electrically controllable variable flow regulator comprises an electro-magnetic solenoid valve unit including a housing defining a main chamber having inlet and outlet connections communicating with the main chamber for the passage of alternative fuel therethrough, at least one electric solenoid unit mounted within said chamber with a shaft of the solenoid unit near the inlet connection being coupled to a valve member associated with a valve seat of the inlet connection so that the valve member is movable by said solenoid unit between fully closed and open positions, or vice versa, and/or to any selected intermediate position in controlling the flow of alternative fuel through said regulator, said valve member being normally movable towards or away from said valve seat and being shaped and arranged for variable opening relative to the valve seat and variable fuel flow control.

18. A dual fuel system as claimed in claim 17, wherein said chamber of said electro-magnetic solenoid valve unit houses two solenoid units co-axially aligned in back to back relationship and the first solenoid unit nearest the inlet connection is the unit having its shaft connected to said valve member, the other of said solenoid units having a shaft normally biased by a compression spring toward said first solenoid unit and its shaft to provide an arrangement whereby said spring biases and maintains said valve member in a fully closed position in the absence of electric power supply to the solenoid units, and on supply of electric power to the solenoid units the shaft of said other solenoid unit is moved against the closing bias of said compression spring to enable operation of the first solenoid unit for variable control of the valve member opening and closing for fuel flow through the regulator.

* * * * *